(12) United States Patent
Luo et al.

(10) Patent No.: US 11,733,107 B2
(45) Date of Patent: Aug. 22, 2023

(54) THERMISTOR SENSOR ARRANGEMENT FOR MEASURING CHIPSET TEMPERATURE

(71) Applicant: Fortinet, Inc., Sunnyvale, CA (US)

(72) Inventors: Shan Luo, Burnaby (CA); Shen Sunny Zhong, Burnaby (CA); Qian Yu, Burnaby (CA); Shenghua Jiang, Jiangsu (CN)

(73) Assignee: Fortinet, Inc., Sunnyvale, CA (US)

( * ) Notice: Subject to any disclaimer, the term of this patent is extended or adjusted under 35 U.S.C. 154(b) by 482 days.

(21) Appl. No.: 17/067,654

(22) Filed: Oct. 10, 2020

(65) Prior Publication Data

US 2022/0113200 A1  Apr. 14, 2022

(51) Int. Cl.
*G01K 7/22* (2006.01)
*G01K 1/08* (2021.01)

(52) U.S. Cl.
CPC ............ *G01K 7/223* (2013.01); *G01K 1/08* (2013.01)

(58) Field of Classification Search
None
See application file for complete search history.

(56) References Cited

U.S. PATENT DOCUMENTS

| | | | | |
|---|---|---|---|---|
| 6,020,820 A | * | 2/2000 | Chiang | H01L 23/34 340/653 |
| 2009/0210190 A1 | * | 8/2009 | Carlson | G01K 3/005 702/130 |
| 2010/0254426 A1 | * | 10/2010 | Okamoto | G01K 1/14 374/141 |
| 2020/0194650 A1 | * | 6/2020 | Scobee | G01N 25/18 |
| 2021/0181819 A1 | * | 6/2021 | Scobee | H01L 23/38 |

FOREIGN PATENT DOCUMENTS

| | | | | | |
|---|---|---|---|---|---|
| CN | 2314398 Y | * | 4/1999 | | |
| CN | 101930951 A | * | 12/2010 | ............ | G01K 13/00 |
| CN | 104754919 A | * | 7/2015 | ............... | G01K 1/16 |

* cited by examiner

*Primary Examiner* — Mirellys Jagan
(74) *Attorney, Agent, or Firm* — HDC Intellectual Property Law, LLP (57) ABSTRACT

A thermistor sensor arrangement for measuring chipset temperature is provided. According to various aspects of the present disclosure, a sensor assembly is placed between a heat sink of a chipset and a PCB on which the chipset is mounted. The sensor assembly includes a thermistor sensor, an electrical connector, and a resilient pad. The thermistor sensor includes a first end having a sensing element and a second end having sensor contacts. The electrical connector has a first interface to receive the sensor contacts, a second interface through which the signals are outputted, and a bottom surface to mount to the PCB. The resilient pad has an upper surface to which the sensing element is attached and a lower surface to engage with the PCB such that when the resilient pad is compressed, spring force of the resilient pad facilitates temperature measurement by pressing the sensing element against the heat sink.

19 Claims, 8 Drawing Sheets

THERMISTOR SENSOR ARRANGEMENT FOR MEASURING CHIPSET TEMPERATURE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to measuring and/or monitoring a temperature of a chipset. In particular, embodiments of the present invention relate to a thermistor sensor assembly that eases installation and facilitates adapting to chipset layout changes.

Description of the Related Art

High performance processors and other components such as chips and switch chipsets are a major heat source in an electrical processing device. The electrical processing device can be any of a basic computer, a handheld device, a server and so forth. The electrical processing device can have an internal built-in temperature sensor such as a thermocouple which measures junction temperature or die temperature and then activates connected cooling devices, e.g., a fan present within the electrical processing device. Thereafter, a fan controller periodically determines temperature from the temperature sensor to adjust the fan speed and thus maintains an optimum temperature for efficient working of the electrical processing device. However, for a chipset having an internal temperature sensor, the temperature sensor cannot typically be directly connected to a System Management Controller (SMC) and therefore, the temperature data cannot be supplied to the fan controller.

To overcome this problem, an external thermistor sensor may be placed in close proximity to the chipset to approximately determine the chip's temperature. Ideally, the thermistor sensor should be placed as close as possible to the chipset being monitored, which may be done by tightly attaching the sensor in a machined groove formed within the top or the bottom of the heat sink with a screw, thermal conductive resin and/or an adhesive mylar. As this is a manual, post-manufacturing process, however, it results in increased cost and installation time. Also, once the thermistor sensor is attached to the heat sink it becomes difficult to adjust or customize the position of the thermistor sensor when the chipset layout is altered.

SUMMARY

A thermistor sensor arrangement is described for measuring chipset temperature. According to various aspects of the present disclosure, a sensor assembly is placed between a heat sink of a chipset and a printed circuit board (PCB) on which the chipset is mounted for measurement of a temperature associated with the chipset. The sensor assembly includes a thermistor sensor, an electrical connector, and a resilient pad. The thermistor sensor includes a first end having a sensing element to measure the temperature and a second end having sensor contacts to output signals indicative of the temperature. The electrical connector has a first interface to receive the sensor contacts, a second interface through which the signals are output, and a bottom surface to mount to the PCB. The resilient pad has an upper surface to which the sensing element is attached and a lower surface to engage with the PCB. Further, when the resilient pad is compressed between the heat sink and the PCB, a spring force of the resilient pad facilitates the measurement by pressing the sensing element against the heat sink.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

A thermistor sensor arrangement is described for measuring chipset temperature. Various embodiments described herein provide an improved mechanism for engaging the thermistor sensor with a heat sink so as to accurately measure a temperature of an associated chipset while also maintaining flexibility to customize the position of the thermistor sensor when the chipset layout is altered.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

A thermistor sensor arrangement is described for measuring chipset temperature. According to various aspects of the present disclosure, a sensor assembly is placed between a heat sink of a chipset and a printed circuit board (PCB) on which the chipset is mounted for measurement of a temperature associated with the chipset. The sensor assembly includes a thermistor sensor, an electrical connector, and a resilient pad. The thermistor sensor includes a first end having a sensing element to measure the temperature and a second end having sensor contacts to output signals indicative of the temperature. The electrical connector has a first interface to receive the sensor contacts, a second interface through which the signals are output, and a bottom surface to mount to the PCB. The resilient pad has an upper surface to which the sensing element is attached and a lower surface to engage with the PCB. Further, when the resilient pad is compressed between the heat sink and the PCB, a spring force of the resilient pad facilitates the measurement by pressing the sensing element against the heat sink.

Figure 1A:
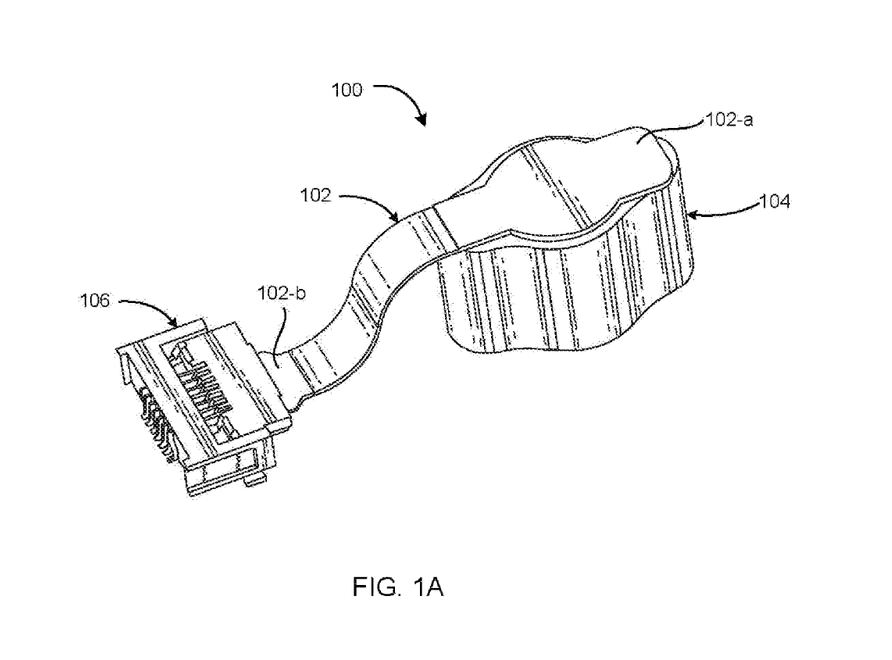
FIG. 1A illustrates an isometric view of a thermistor sensor assembly in accordance with an embodiment of the present invention.

FIG. 1A illustrates an isometric view 100 of a thermistor sensor assembly in accordance with an embodiment of the present invention. According to an embodiment, a sensor assembly is placed between a heat sink of a chipset and a printed circuit board (PCB) on which the chipset is mounted for measurement of a temperature associated with the chipset. Sensor assembly includes a thermistor sensor 102, an electrical connector 106, and a resilient pad 104. Thermistor sensor 102 includes a first end 102-a having a sensing element to measure the temperature and a second end 102-b having sensor contacts to output signals indicative of the temperature. The sensor contacts include conductors of a flexible flat cable (FFC). In an embodiment, the conductors of any other suitable flat and flexible material may also be used, such that the sensor may include the connector of a particular type of cable and the particular type of cable may be attached to a connector on PCB.

The sensing element on first end 102-a may include a stiff, flat sensing area. Further, the sensing element includes a flex foil circuit. An advantage of flexfoil is that the surface of the flexfoil sensor (e.g., the contact point with heatsink) is very smooth and flat, thereby creating a good contact surface. In one embodiment the flexfoil senor is a negative temperature coefficient (NTC) thermistor sensor.

Electrical connector 106 of the sensor assembly has a first interface to receive the sensor contacts, a second interface through which the signals are output, and a bottom surface to mount to the PCB. In one embodiment, electrical connector 106 comprises a Flexible Printed Circuit (FPC) connector.

The sensing element may be bonded to the upper surface of the resilient pad 104 using a temperature resistant adhesive. Also, the temperature resistant adhesive may be used to bond the lower surface of resilient pad 104 to the PCB. Resilient pad 104 of the sensor assembly has an upper surface to which the sensing element is attached and a lower surface to engage with the PCB. When resilient pad 104 is compressed between the heat sink and the PCB, a spring force of resilient pad 104 facilitates in the temperature measurement by pressing the sensing element against the heat sink. Resilient pad 104 has a compression ratio of between 20% to 40%. Non-limiting examples of materials that may be used to form the resilient pad 104 include foam, rubber, silicone and other materials having the desired compression ratio.

Figure 1B:
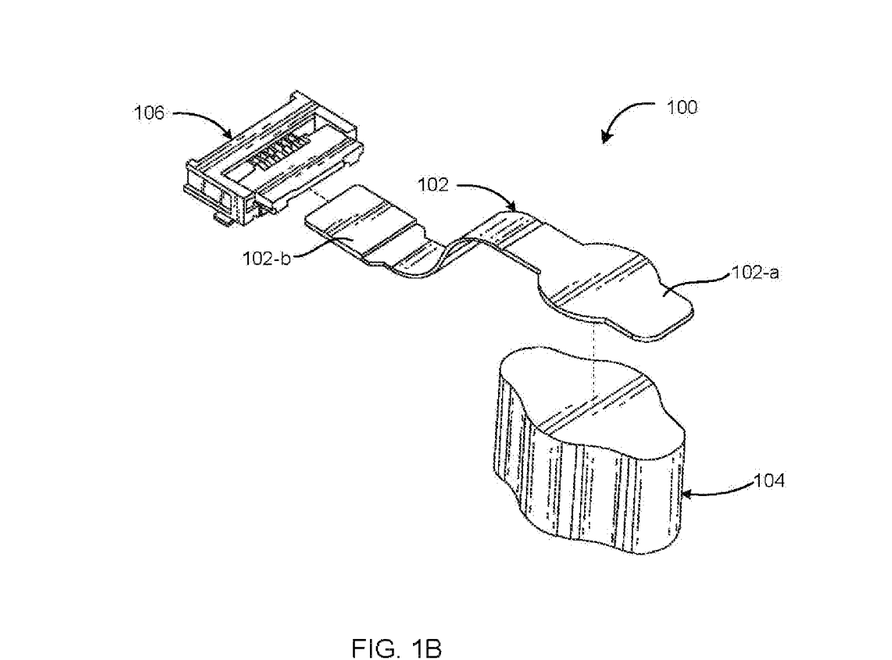
FIG. 1B illustrates an exploded view of the thermistor sensor assembly of FIG. 1A.

FIG. 1B illustrates an exploded view 100 of the thermistor sensor assembly of FIG. 1A. In the context of the present example, an exploded view of the thermistor sensor assembly is shown. A thermistor sensor 102 has a first end 102-a having a sensing element to measure the temperature and a second end 102-b with sensor contacts to output signals indicative of temperature of a chipset. First end 102-a is aligned and attached to an upper surface of resilient pad 104, and second end 102-b is adjusted and coupled to a first interface of an electrical connector 106.

In an embodiment, electrical connector 106 may be mounted on a PCB using a Surface-Mount Technology (SMT). For example, when a NTC thermistor is placed on a resilient pad 104 instead of mounting directly on heat sink, greater flexibility is provided in connection with placing a thermal sensor FPC connector and supporting resilient pad.

Figures 2A, 2B:
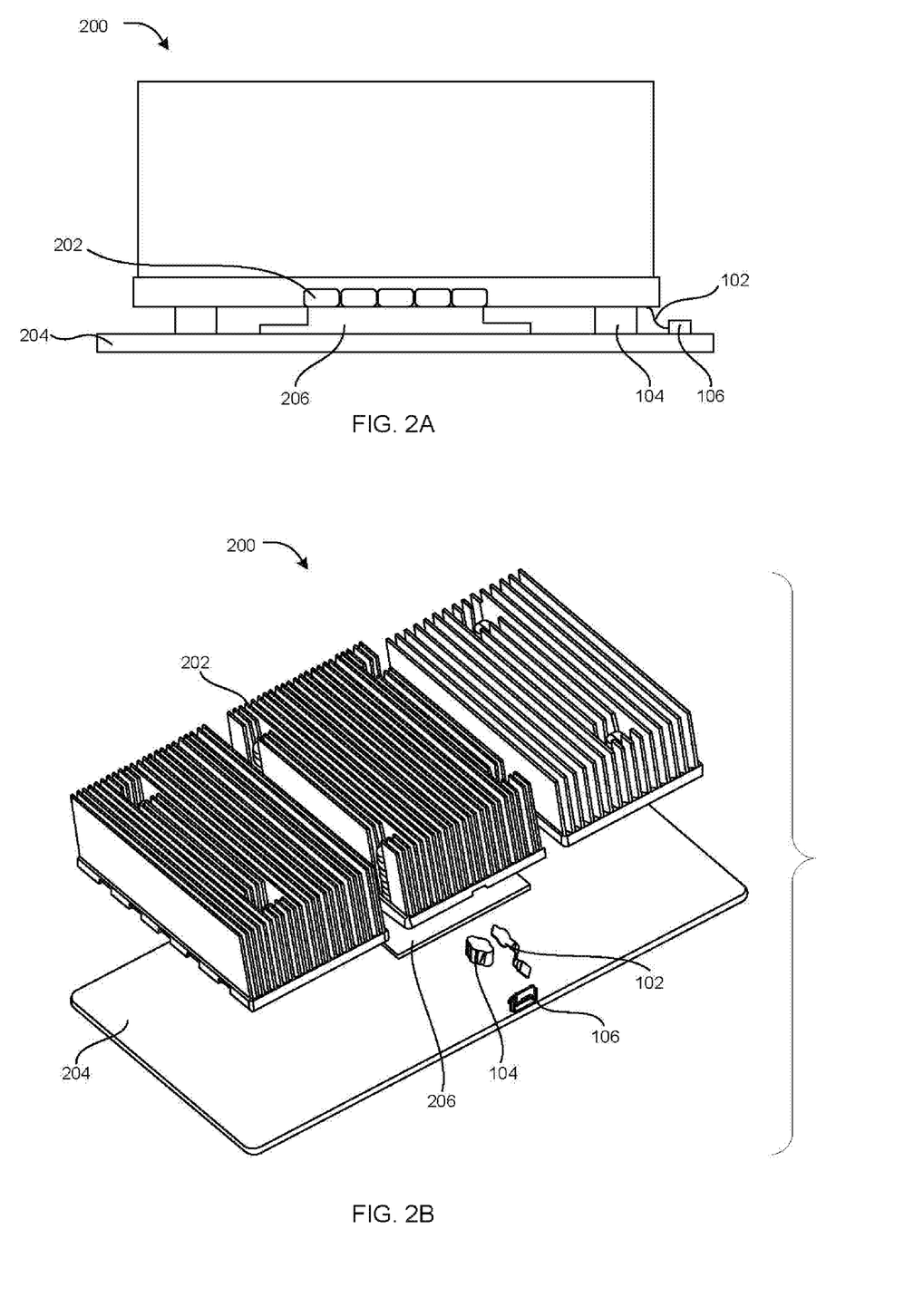
FIG. 2A illustrates a section view of a thermistor sensor assembly installed between a printed circuit board (PCB) and a heat sink in accordance with an embodiment of the present invention.
FIG. 2B illustrates an exploded view of the thermistor sensor assembly of FIG. 2A.

FIG. 2A illustrates a section view 200 of a thermistor sensor assembly installed between a printed circuit board (PCB) and a heat sink in accordance with an embodiment of the present invention. The section view 200 shows a PCB 204, a chipset 206 mounted on PCB 204, a heat sink 202 mounted on chipset 206, and a sensor assembly placed between heat sink 202 and PCB 204 for measurement of a temperature associated with chipset 206. The sensor assembly includes a thermistor sensor 102 having a first end with a sensing element to measure the temperature and a second end having sensor contacts to output signals indicative of the temperature. Further, the sensor assembly includes an electrical connector 106 having a first interface coupled to the sensor contacts, a second interface through which the signals are output, and a bottom surface mounted to PCB 204. Also, the sensor assembly includes a resilient pad 104, having an upper surface to which the sensing element is attached and a lower surface engaging PCB 204. Resilient pad 104 is compressed between heat sink 202 and PCB 204 to create a spring force that presses the sensing element against heat sink 202. Further, resilient pad 104 may have a compression ratio of between 20% to 40%. In an embodiment, thermistor sensor 102 is not mounted on heat sink 202, alternatively it uses resilient pad 104 which sticks on top of PCB 204 to support NTC thermistor sensor.

When resilient pad 104 is compressed between heat sink 202 and PCB 204, a spring force of resilient pad 104 enables measurement of a temperature associated with chipset 206 by pressing sensing element of thermistor sensor 102 against heat sink 202. There may be flexibility in a mounting position of thermistor sensor 102, as resilient pad 104 may be placed in an empty space near chipset 206. Those skilled in the art will appreciate that position of the sensor assembly is adjustable with respect to changes in layout of chipset 206. In an embodiment, resilient pad 104 may be, for example, of a foam material or of a rubber silicone material or any other suitable material having spring characteristic.

FIG. 2B illustrates an exploded view 200 of the thermistor sensor assembly of FIG. 2A. The sensor assembly is placed between a heat sink 202 of a chipset 206 and PCB 204 on which chipset 206 is mounted. A temperature resistant adhesive is present on both sides of resilient pad 104. The temperature resistant adhesive bonds sensing element of the thermistor sensor to an upper surface of resilient pad 104, and a lower surface of resilient pad 104 to PCB 204. The sensing element may include a stiff, flat sensing area and a flex foil circuit. In an embodiment, flex foil circuit may be used as surface of a flex foil sensor that acts as contact point with heat sink is very smooth and flat. In an embodiment, shape of resilient pad 104 may be similar to the flat sensing area of the sensing element so as to completely cover area of the sensing element bonded to resilient pad 104. This may also facilitate to limit size of resilient pad 104 being placed on PCB 204 thereby leading to saving of additional space on PCB 204. The thermistor sensor may include a NTC thermistor sensor, and one side of the NTC thermistor sensor may be mated with electrical connector 106, while another side may be glued to resilient pad 104 and pressed against bottom of heat sink 202 while heat sink 202 is mounted on PCB board 204.

Figure 3:
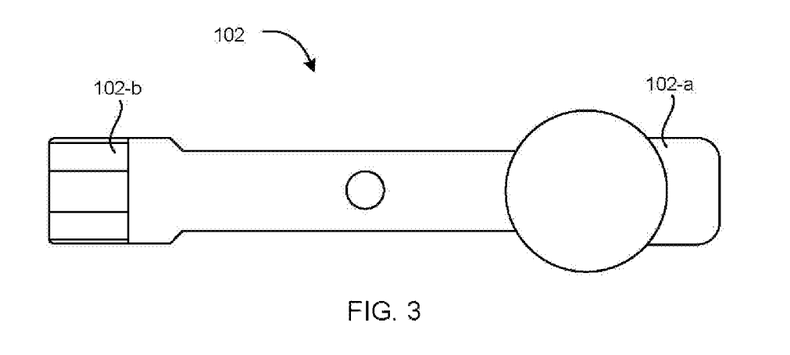
FIG. 3 illustrates a top view of a thermistor sensor according to an example embodiment of the present invention.

FIG. 3 illustrates a top view of a thermistor sensor 102 according to an example embodiment of the present invention. In the context of the present example, a first end 102-*a* of a thermistor sensor 102 includes a sensing element to measure chipset temperature, and a second end 102-*b* includes sensor contacts to output signals that are indicative of the chipset temperature. Thermistor sensor 102 may include a NTC thermistor sensor such that thermistor sensor 102 is enclosed a semi-round epoxy. Further, the sensor contacts may include conductors of a FFC. The sensing element may include a stiff, flat sensing area on one side and a semi-round insulating epoxy on other side. The stiff flat sensing area may be pressed against a flat surface by means of an insulating material (e.g., silicone foam), by spring force or by taping it with a double sided temperature resistant adhesive. In an embodiment, the sensor contacts may be connected to a PCB counter-connector or wire-to-wire connector or soldered to conductors, or crimped with FFC connectors and ZiF connectors.

Figure 4A:
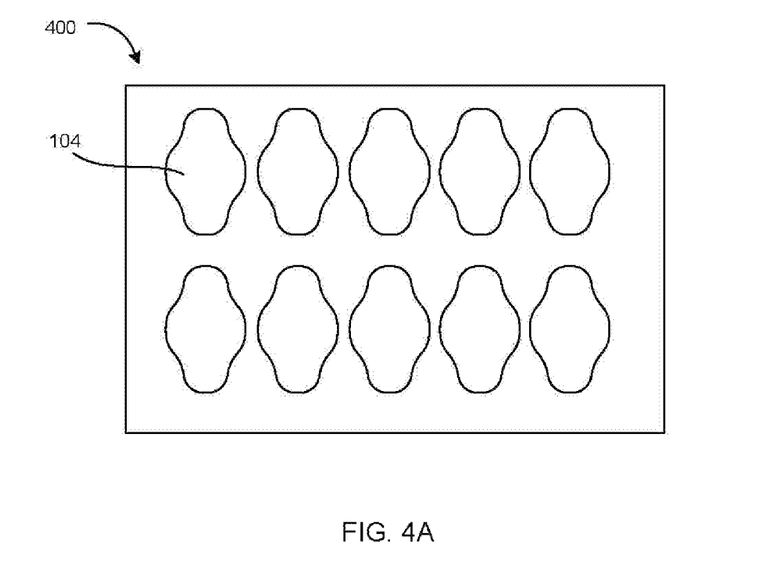
FIG. 4A illustrates a top view of a sheet having multiple resilient pads according to an example embodiment of the present invention.

FIG. 4A illustrates a top view 400 of a sheet having multiple resilient pads 104 according to an example embodiment of the present invention. In the context of the present example, is shown a sheet having multiple resilient pads 104. The sheet may have a thickness of around 6.80 mm. In an embodiment, sheet may be made of e.g., medium firmness silicone that offers lightness of foam, with enhanced sealing capabilities of a traditional sponge rubber. Material of the sheet may also be used to reduce shock or isolate vibration. The resilient pad (e.g., a foam pad) may have a compression ratio of between 20% to 40%.

Figure 4B:
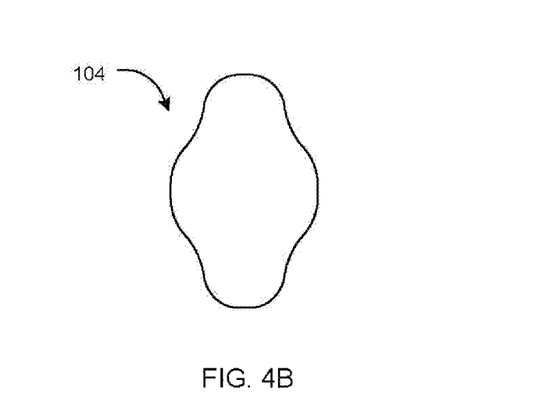
FIG. 4B illustrates a top view of a resilient pad with a shape similar to that of a flat sensing area of a thermistor sensor according to an example embodiment of the present invention.

FIG. 4B illustrates a top view of a resilient pad 104 with a shape similar to that of a flat sensing area of a thermistor sensor according to an example embodiment of the present invention. In the context of the present example, is shown a resilient pad 104, with a thickness of around 6.40 mm, a length of around 11.00 mm, and a breadth of around 7.00 mm. As can be appreciated by those skilled in the art, thickness of resilient pad 104 may be based on a distance between top of PCB and bottom of heat sink.

Figure 5A:
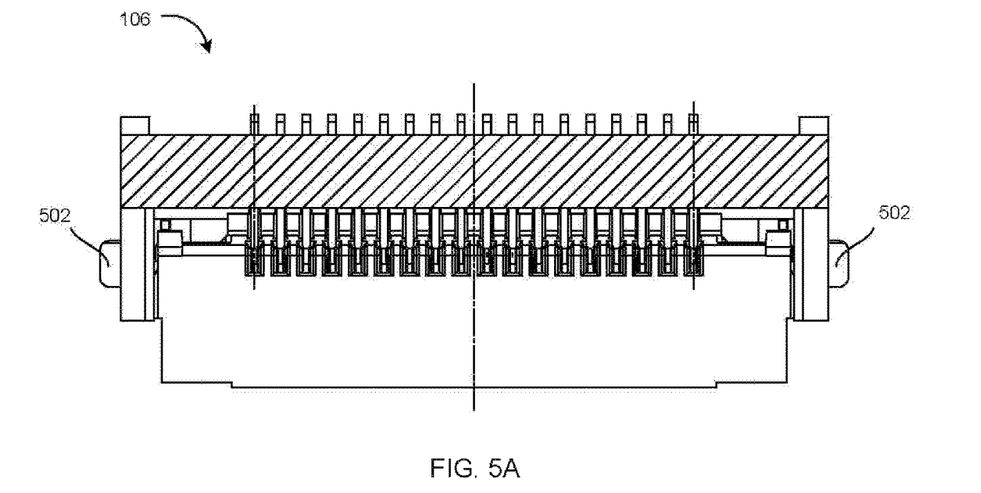
FIG. 5A illustrates a top view of an electrical connector according to an example embodiment of the present invention.

FIG. 5A illustrates a top view 106 of an electrical connector 106 according to an example embodiment of the present invention. In the context of the present example, is presented a top view 106 of the electrical connector 106. Electrical connector 106 has a first interface to receive sensor contacts, and a second interface through which the signals are output. Further, electrical connector 106 has a bottom surface to mount to PCB. Electrical connector may include a FPC connector. Electrical connector 106 has fitting nails 502 on both sides. The fitting nail may be made of e.g., phosphor bronze material. The electrical connector as described herein may be any of a suitable FPC connector with suitable standard dimensions. The electrical connectors being used may be procured from manufacturers such as but not limited to Molex incorporated, TE connectivity, Amphenol, Delphi connection systems and so forth.

Figure 5B:
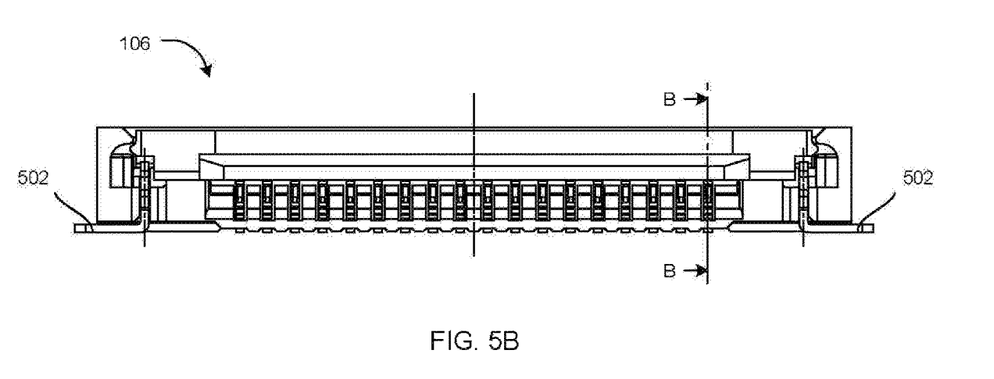
FIG. 5B illustrates a front view of an electrical connector according to an example embodiment of the present invention.

FIG. 5B illustrates a front view of an electrical connector 106 according to an example embodiment of the present invention. In the context of the present example, is presented a front view of electrical connector 106. As illustrated at 502 are fitting nails present on both sides of electrical connector 106.

Figure 5C:
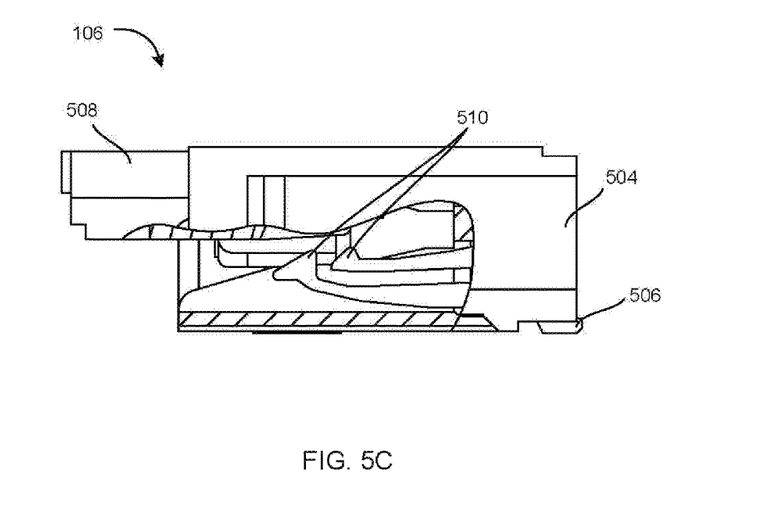
FIG. 5C illustrates a sectional view of an electrical connector with contact points through section lines B-B of FIG. 5B according to an example embodiment of the present invention.

FIG. 5C illustrates a sectional view of an electrical connector 106 with contact points through section lines B-B of FIG. 5B according to an example embodiment of the present invention. In the context of the present example, is shown at 504, is a housing of electrical connector 106. Housing may be made of e.g., a glass filled liquid crystal polymer material. At 506, is illustrated a terminal of electrical connector 106. The terminal may be made of e.g., a phosphor bronze material. At 508, is illustrated an actuator of electrical connector 106. The actuator may be of e.g., glass filled polyamide material. Further, at 510 is illustrated contact points present inside electrical connector 106.

Figure 5D:
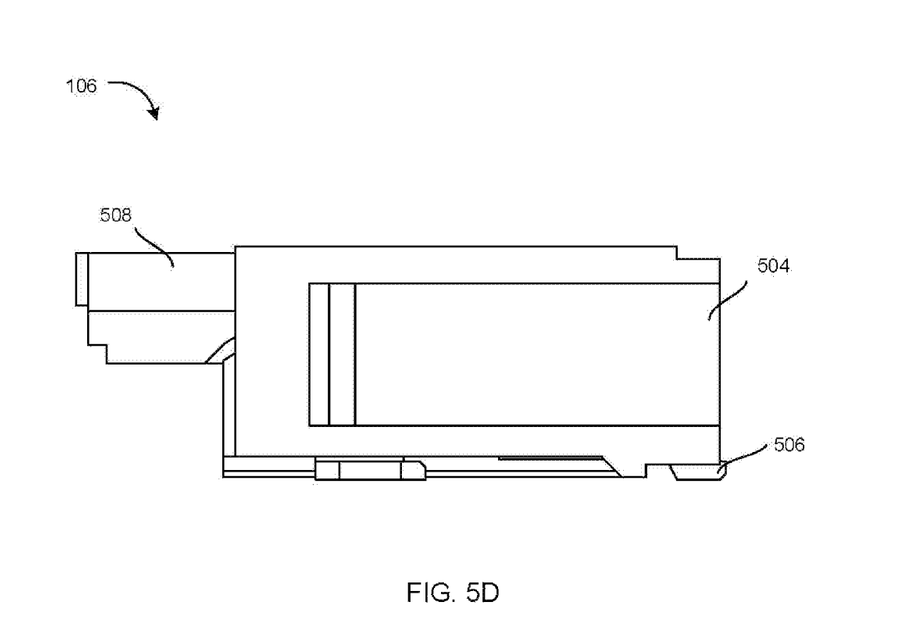
FIG. 5D illustrates a sectional view of an electrical connector in a non-actuated position through section lines B-B of FIG. 5B according to an example embodiment of the present invention.

FIG. 5D illustrates a sectional view of an electrical connector 106 in a non-actuated position through section lines B-B of FIG. 5B according to an example embodiment of the present invention. In context of the present example, is shown at 504 is a housing of electrical connector 106, at 506 is illustrated a terminal of electrical connector 106, and at 508 is illustrated an actuator of electrical connector 106.

Figure 5E:
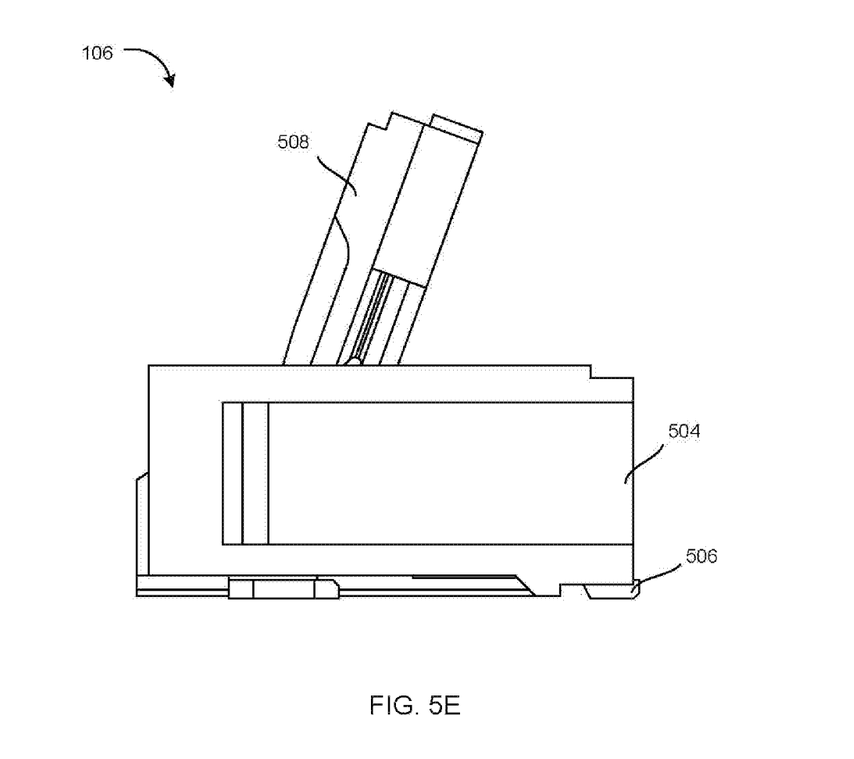
FIG. 5E illustrates a sectional view of an electrical connector in an actuated position through section lines B-B of FIG. 5B according to an example embodiment of the present invention.

FIG. 5E illustrates a sectional view of an electrical connector 106 in an actuated position through section lines B-B of FIG. 5B according to an example embodiment of the present invention. In context of the present example, is shown at 504 is a housing of electrical connector 106, at 506 is illustrated a terminal of electrical connector 106, and at 508 is shown an actuator of electrical connector 106.

Figure 6A:
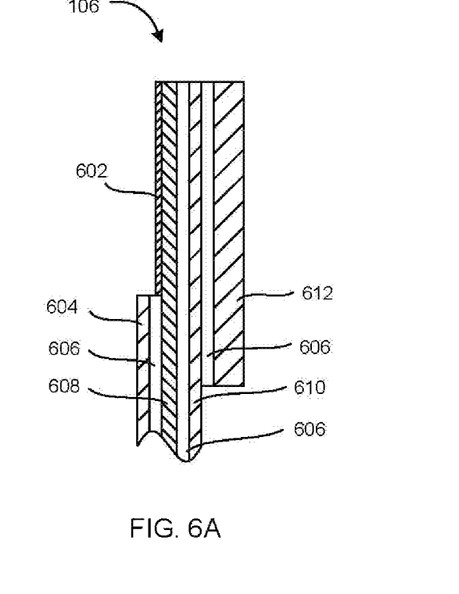
FIG. 6A illustrates a structure of a Flexible Printed Circuit (FPC) connector according to an example embodiment of the present invention.

FIG. 6A illustrates a structure of a Flexible Printed Circuit (FPC) connector 106 according to an example embodiment of the present invention. In context of the present example, as illustrated at 602 is a plating of FPC connector 106. The plating may be of material e.g., gold (0.1 μm Min.) and nickel under (1.5 μm). At 604, is illustrated a cover film of e.g., polyimide (25 μm) material. At 606, is illustrated a layer of thermosetting adhesive. Further, at 608, is illustrated, a conductor made of material e.g., copper foil (35 μm). At 610, is illustrated a base film of e.g., polyimide (25 μm) material. Also, at 612, is illustrated a stiffener of e.g., polyimide material. In an embodiment, it is recommended to apply an appropriate amount of adhesive on adherend, as application of extra adhesive may cause a defect in an electrical continuity.

Figure 6B:
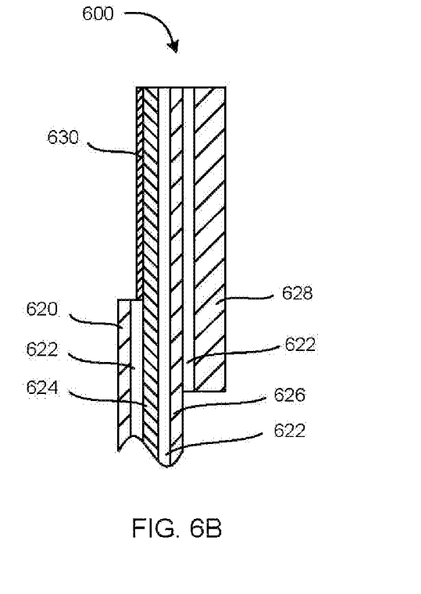
FIG. 6B illustrates a structure of a Flexible Film Circuit (FFC) connector according to an example embodiment of the present invention.

FIG. 6B illustrates a structure 600 of a Flexible Film Circuit (FFC) connector according to an example embodiment of the present invention. In the context of the present example, as shown at 630 is a plating of FFC connector 106. The plating may be that of material e.g., gold (0.1 μm Min.) and nickel under (1 μm-5 μm). At 620, is illustrated an insulating film of e.g., pet (25 μm) material. At 622, is illustrated a layer of adhesive. The adhesive may be e.g., a flame-retardant polyester adhesive. Further, at 624, is illustrated, a conductor made of e.g., copper foil (35 μm or 50 μm). At 626, is illustrated an insulating film of e.g., pet (25 μm) material. Also, at 628, is illustrated a stiffener of e.g., pet material.

Figure 7:
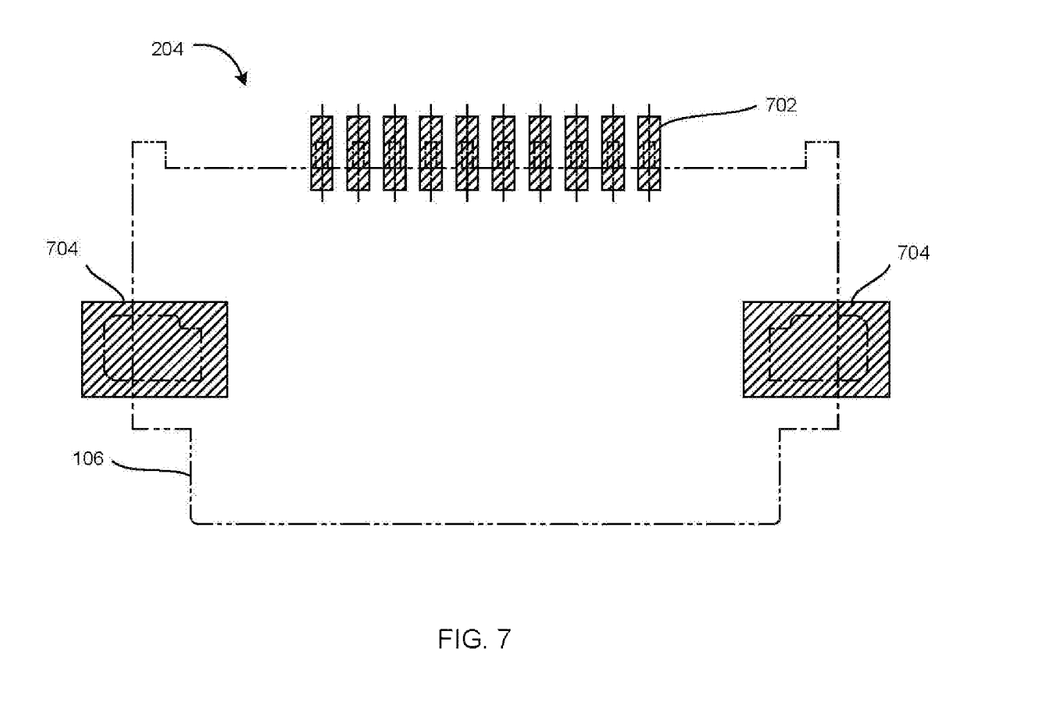
FIG. 7 illustrates a pattern layout of PCB showing positioning of an FPC connector according to an example embodiment of the present invention.

FIG. 7 illustrates a pattern layout of PCB 204 showing positioning of an FPC connector 106 according to an example embodiment of the present invention. In the context of the present example, as shown at 702 is a set of contact points for connection of FPC connector 106 on PCB 204. At 704 is shown a pair of contact points for fitting of FPC connector teeth on PCB 204.

Figure 8:
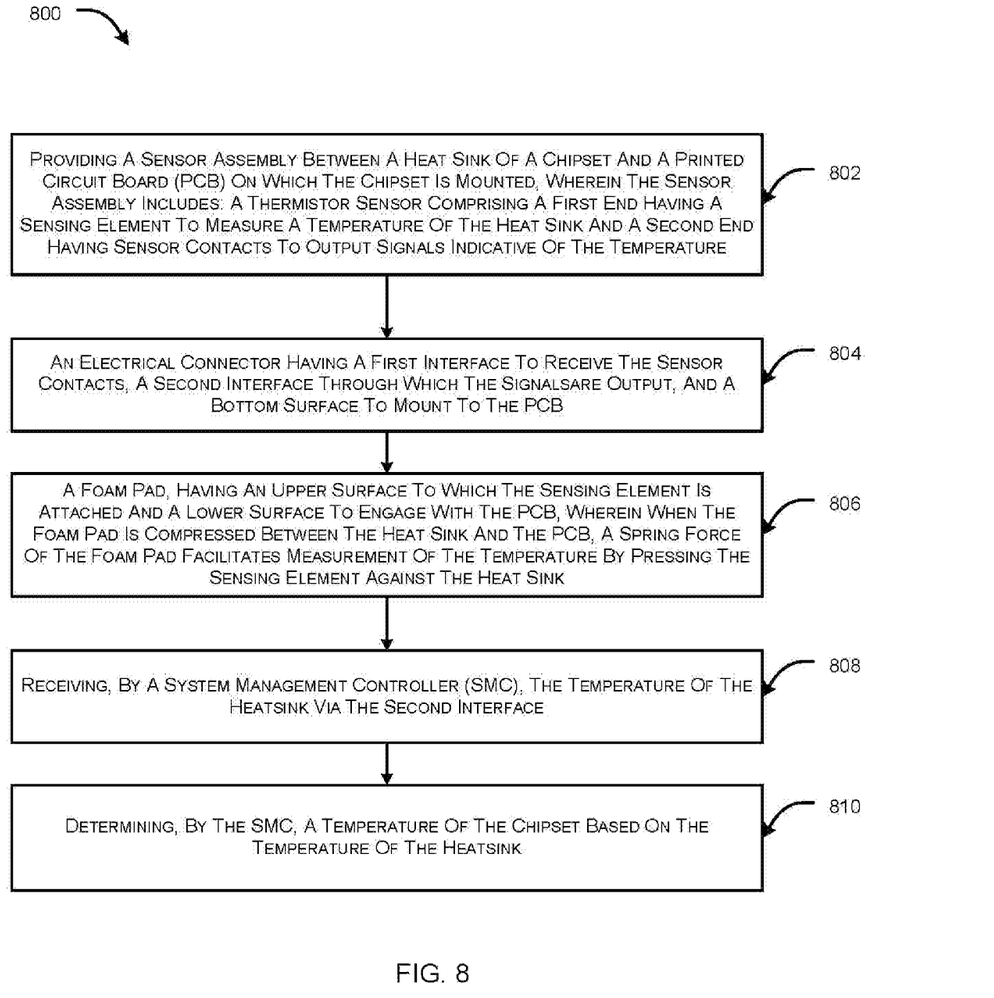
FIG. 8 is a flow diagram illustrating a process for providing of a sensor assembly for determination of a chipset temperature in accordance with an embodiment of the present invention.

FIG. 8 is a flow diagram 800 illustrating a process for providing of a sensor assembly for determination of a chipset temperature in accordance with an embodiment of the present invention. In an embodiment, at block 802, a sensor assembly is provided between a heat sink of a chipset and a PCB on which the chipset is mounted. The sensor assembly includes a thermistor sensor including a first end having a sensing element to measure a temperature of the heat sink and a second end having sensor contacts to output signals indicative of the temperature. At block 804, an electrical connector has a first interface to receive the sensor contacts a second interface through which the signals are output, and a bottom surface to mount to the PCB. Further, at block 806 a resilient pad (e.g., a foam pad) has an upper surface to which the sensing element is attached and a lower surface to engage with the PCB. When the resilient pad is compressed between the heat sink and the PCB, a spring force of the resilient pad facilitates measurement of the temperature by pressing the sensing element against the heat sink. At block 808, a system management controller (SMC), receives the temperature of the heat sink via the second interface. Furthermore, at block 810, the SMC determines a temperature of the chipset based on the temperature of the heat sink.

Figure 9:
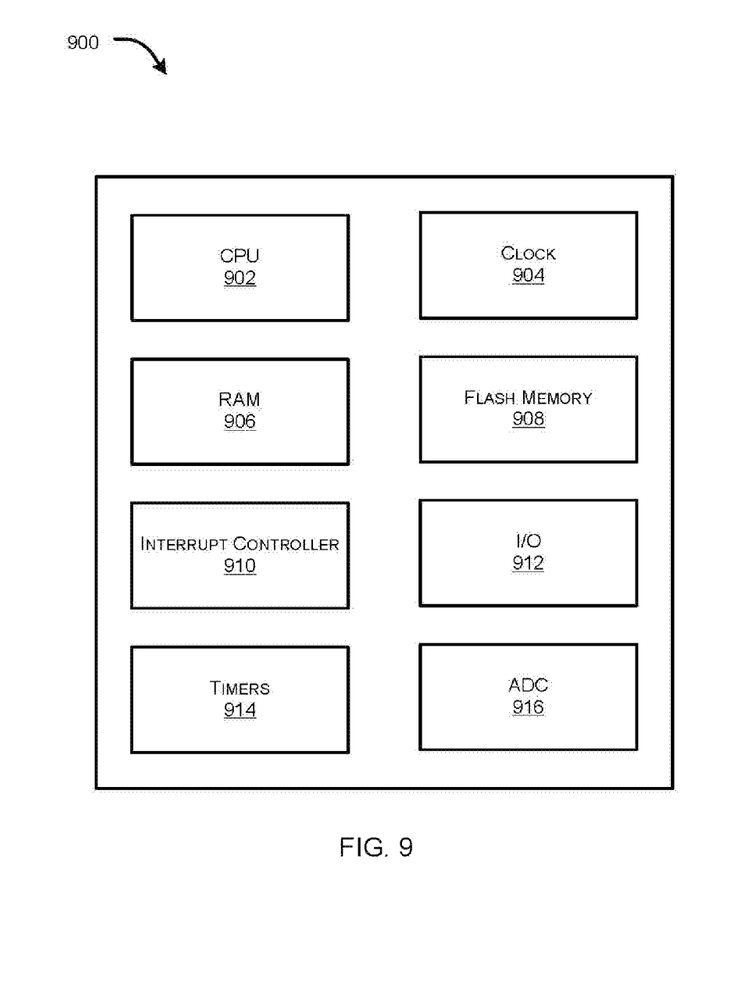
FIG. 9 illustrates an exemplary block diagram of a System Management Controller (SMC) in which or with which embodiments of the present invention may be utilized.

FIG. 9 illustrates an exemplary block diagram 900 of System Management Controller (SMC) in which or with which embodiments of the present invention may be utilized. Based on microcontroller architecture an exemplary block diagram of SMC is provided. In an embodiment, SMC may be an embedded controller that may be considered to be a microcontroller, with I/O and internal features targeted to suit typical needs of a low power platform. The SMC may include items which have one hardware defined function such as clock 904, interrupt controller 914, I/O 912, timers 914, and analog-to-digital converter (ADC) 916. Further, SMC may include a programmable group that consists of CPU 902, RAM 906, and flash memory blocks 908. Also, functions of flash memory blocks 908 are defined by a firmware programmed in flash memory.

In an embodiment, SMC aspects of the embedded controller functionality may facilitate to provide functions e.g., thermal management, power monitoring, battery management and so forth. In an embodiment, SMC may determine and monitor temperature of a processor, a chipset, memory modules and other parts of a system. The temperature may be actively monitored by determining reading from thermal sensors, Platform Environment Control Interface (PECI) transactions and by using other thermal reporting services. Also, system bus may be used to report at least some of system thermal information. The determined information may be used to implement functions e.g., dynamic control of system thermal solution and provision of user alerts.

In an embodiment, SMC may have Pulse Width Modulation (PWM) interfaces that may be used to control system fans. The fans may generally be controlled using system input processed by programmable functionality.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A sensor assembly to be placed between a heat sink of a chipset and a printed circuit board (PCB) on which the chipset is mounted for measurement of a temperature associated with the chipset, the sensor assembly comprising:
    a thermistor sensor comprising a first end having a sensing element to measure the temperature and a second end having sensor contacts to output signals indicative of the temperature;
    an electrical connector having a first interface to receive the sensor contacts, a second interface through which the signals are output, and a bottom surface to mount to the PCB; and
    a resilient pad having an upper surface to which the sensing element is attached and a lower surface to engage with the PCB, wherein when the resilient pad is compressed between the heat sink and the PCB, a spring force of the resilient pad facilitates the measurement by pressing the sensing element against the heat sink.

2. The sensor assembly of claim 1, wherein the sensor contacts comprise conductors of a flexible flat cable (FFC).

3. The sensor assembly of claim 1, wherein the electrical connector comprises a Flexible Printed Circuit (FPC) connector.

4. The sensor assembly of claim 1, wherein resilient pad has a compression ratio of between 20% to 40%.

5. The sensor assembly of claim 1, wherein a temperature resistant adhesive bonds the sensing element to the upper surface of the resilient pad.

6. The sensor assembly of claim 5, wherein the temperature resistant adhesive bonds the lower surface of the resilient pad to the PCB.

7. The sensor assembly of claim 1, wherein the sensing element comprises a stiff, flat sensing area.

8. The sensor assembly of claim 7, wherein the sensing element comprises a flex foil circuit.

9. The sensor assembly of claim 8, wherein the thermistor sensor comprises a negative temperature coefficient (NTC) thermistor sensor.

10. A system comprising:
a printed circuit board (PCB);
a chipset mounted on the PCB;
a heat sink mounted on the chipset; and
a sensor assembly placed between the heat sink and the PCB for measurement of a temperature associated with the chipset, the sensor assembly comprising:
a thermistor sensor comprising a first end having a sensing element to measure the temperature and a second end having sensor contacts to output signals indicative of the temperature;
an electrical connector having a first interface coupled to the sensor contacts, a second interface through which the signals are output, and a bottom surface mounted to the PCB; and
a resilient pad having an upper surface to which the sensing element is attached and a lower surface engaging the PCB, wherein the resilient pad is compressed between the heat sink and the PCB creating a spring force that presses the sensing element against the heat sink.

11. The system of claim 10, wherein the sensor contacts comprise conductors of a flexible flat cable (FFC).

12. The system of claim 10, wherein the electrical connector comprises a Flexible Printed Circuit (FPC) connector.

13. The system of claim 10, wherein resilient pad has a compression ratio of between 20% to 40%.

14. The system of claim 10, wherein a temperature resistant adhesive bonds the sensing element to the upper surface of the resilient pad.

15. The system of claim 14, wherein the temperature resistant adhesive bonds the lower surface of the resilient pad to the PCB.

16. The system of claim 10, wherein the sensing element comprises a stiff, flat sensing area.

17. The system of claim 16, wherein the sensing element comprises a flex foil circuit.

18. The system of claim 17, wherein the thermistor sensor comprises a negative temperature coefficient (NTC) thermistor sensor.

19. A method comprising:
providing a sensor assembly between a heat sink of a chipset and a printed circuit board (PCB) on which the chipset is mounted, wherein the sensor assembly includes:
a thermistor sensor comprising a first end having a sensing element to measure a temperature of the heat sink and a second end having sensor contacts to output signals indicative of the temperature;
an electrical connector having a first interface to receive the sensor contacts, a second interface through which the signals are output, and a bottom surface to mount to the PCB; and
a resilient pad having an upper surface to which the sensing element is attached and a lower surface to engage with the PCB, wherein when the resilient pad is compressed between the heat sink and the PCB, a spring force of the resilient pad facilitates measurement of the temperature by pressing the sensing element against the heat sink;
receiving, by a system management controller (SMC), the temperature of the heat sink via the second interface; and
determining, by the SMC, a temperature of the chipset based on the temperature of the heat sink.

* * * * *